US 8,645,066 B2

(12) United States Patent
Damon

(10) Patent No.: US 8,645,066 B2
(45) Date of Patent: Feb. 4, 2014

(54) VARIABLE CORRIDOR NAVIGATION

(75) Inventor: Todd E. Damon, Phoenix, AZ (US)

(73) Assignee: General Motors LLC., Detroit, MI (US)

(*) Notice: Subject to any disclaimer, the term of this patent is extended or adjusted under 35 U.S.C. 154(b) by 228 days.

(21) Appl. No.: 13/179,037

(22) Filed: Jul. 8, 2011

(65) Prior Publication Data
US 2013/0013197 A1 Jan. 10, 2013

(51) Int. Cl.
G01C 21/34 (2006.01)
(52) U.S. Cl.
USPC .................... 701/533; 340/995.19
(58) Field of Classification Search
USPC ........ 701/533, 468–469, 417–418, 408–412, 701/420, 532, 454; 340/990, 995.21, 340/995.19, 991
See application file for complete search history.

(56) References Cited

U.S. PATENT DOCUMENTS

2006/0025923 A1* 2/2006 Dotan et al. .................. 701/207

* cited by examiner

Primary Examiner — Thomas Black
Assistant Examiner — Luke Huynh
(74) Attorney, Agent, or Firm — Leydig, Voit & Mayer, Ltd

(57) ABSTRACT

The described method and system provide for GPS navigation utilizing variable route corridors. The method may be implemented at a GPS-capable device (e.g. a telematics unit in one implementation) or through a call center that provides navigation services to a telecommunications device (e.g. a telematics unit in another implementation). A user input corresponding to an intended destination is received and a route to the intended destination is calculated with a variable route corridor. The variable route corridor is calculated based on map features, such as other streets not on the route, the width of streets on the route, and map data inaccuracies. In preferred implementations, the system and method are implemented within the context of a GPS unit that is part of a telematics unit in a vehicle.

10 Claims, 4 Drawing Sheets

VARIABLE CORRIDOR NAVIGATION

BACKGROUND OF THE INVENTION

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

One of the services conventionally provided by TSPs is GPS (global positioning system) navigation, which may include the provision of Turn-by-Turn (TBT) directions. To use GPS navigation, a user of the telematics unit may enter a destination, and the GPS component of the telematics unit may provide directions (e.g. through a display and/or through vocal instructions) to the user based on a calculated course from the user's current location to the user's destination. When a user does not follow the directions and goes off-course (i.e., when the position of the vehicle is not on the calculated course), the GPS unit may recalculate a new course for the user to take based on the vehicle's position when it goes off-course.

In areas with tall buildings such as the downtown area of cities, known as "urban canyons," positional accuracy may degrade due to GPS bouncing off of buildings before being detected and processed by a GPS device. This problem is known as "multipath," and may lead to the display of erroneous position information to a user, as well as unnecessary off-route notifications and route recalculation.

Thus, it is an object in part to provide a system and method for providing improved navigation within problem areas such as urban canyons. However, while this is an object underlying certain implementations of the invention, it will be appreciated that the invention is not limited to systems that solve the problems noted herein. Moreover, the inventors have created the above body of information merely for the convenience of the reader; the foregoing is a discussion of problems discovered and/or appreciated by the inventors, and is not an attempt to review or catalog the prior art.

BRIEF SUMMARY OF THE INVENTION

The invention provides a system and method for GPS navigation utilizing variable route corridors. In one implementation, a GPS device may receive an input from a user corresponding to an intended destination; calculate a route from a starting position to the intended destination, wherein the calculated route comprises a variable route corridor; receive position information corresponding to a determined position of the GPS device; and determine whether the determined position of the GPS device is within the variable route corridor. The variable route corridor of the calculated route may comprise corridor widths based on map data, particularly, based on the location of at least one street that is not part of the calculated route, the width of at least one road that is part of the calculated route, or known inaccuracies of the map data.

In another implementation, a call center may receive information from a telematics unit corresponding to an intended destination; calculate a route from a starting position to the intended destination, wherein the calculated route comprises a variable route corridor; and transmit, to the telematics unit, the calculated route.

The inventive principles described herein may be implemented as computer executable instructions on a tangible, non-transient computer-readable medium in a GPS system. In preferred implementations, the system and method are implemented within the context of a GPS unit that is part of a telematics unit in a vehicle.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for GPS navigation utilizing variable corridors. In preferred implementations, the GPS navigation may be performed by a GPS unit that is part of a telematics system on a vehicle.

Figure 1:
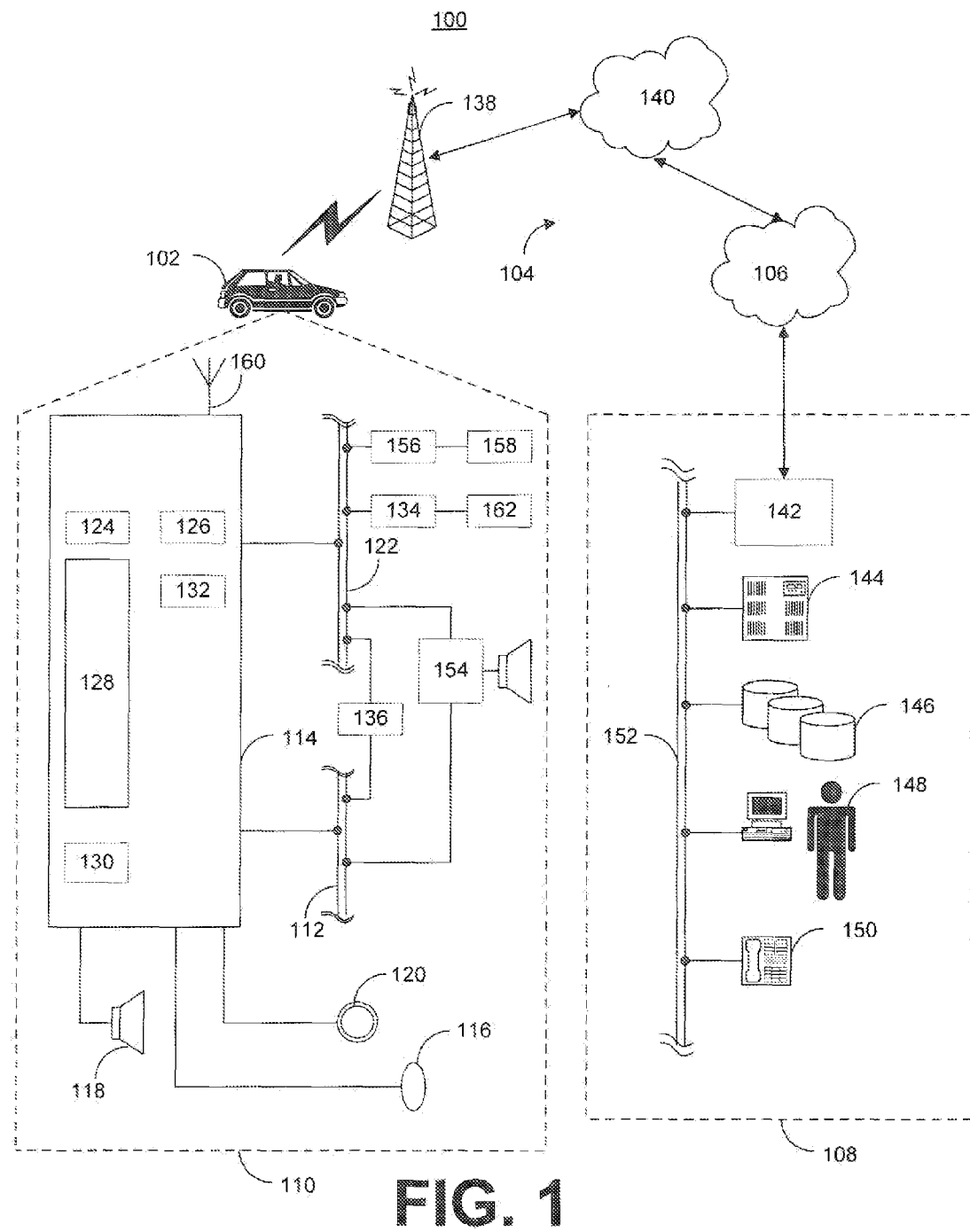
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle.

GPS navigation services may be implemented based on the geographic position information of the vehicle provided by the GPS based chipset/component 132. A user of the telematics unit may enter a destination using inputs corresponding to the GPS component, and a route to a destination may be calculated based on the destination address and an inputted starting address, or a current position of the vehicle determined at approximately the time of route calculation, or based on other position information corresponding to the vehicle.

Turn-by-turn (TBT) directions may further be provided on a display screen corresponding to the GPS component and/or through vocal directions provided through a vehicle audio component 154. It will be appreciated that the calculation-related processing may occur at the telematics unit or may occur at a call center 108. It will be appreciated that TBT directions is merely a type of GPS navigation, and because the principles described herein are applicable to GPS navigation, they are equally applicable to GPS navigation through TBT directions. It will also be appreciated that the processing associated with GPS navigation/TBT directions may be carried out at a vehicle through a telematics unit, at a TSP call center, or both (e.g. the intelligence for route calculation may be implemented locally at the GPS unit of the vehicle, or may be implemented at the call center and provided wirelessly to the vehicle).

Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission.

In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech.

The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server.

As appreciated by those skilled in the art, various cell tower/base station/MSC arrangements are possible and could be used with wireless system 104 (also referred to as the "cellular network" herein). For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
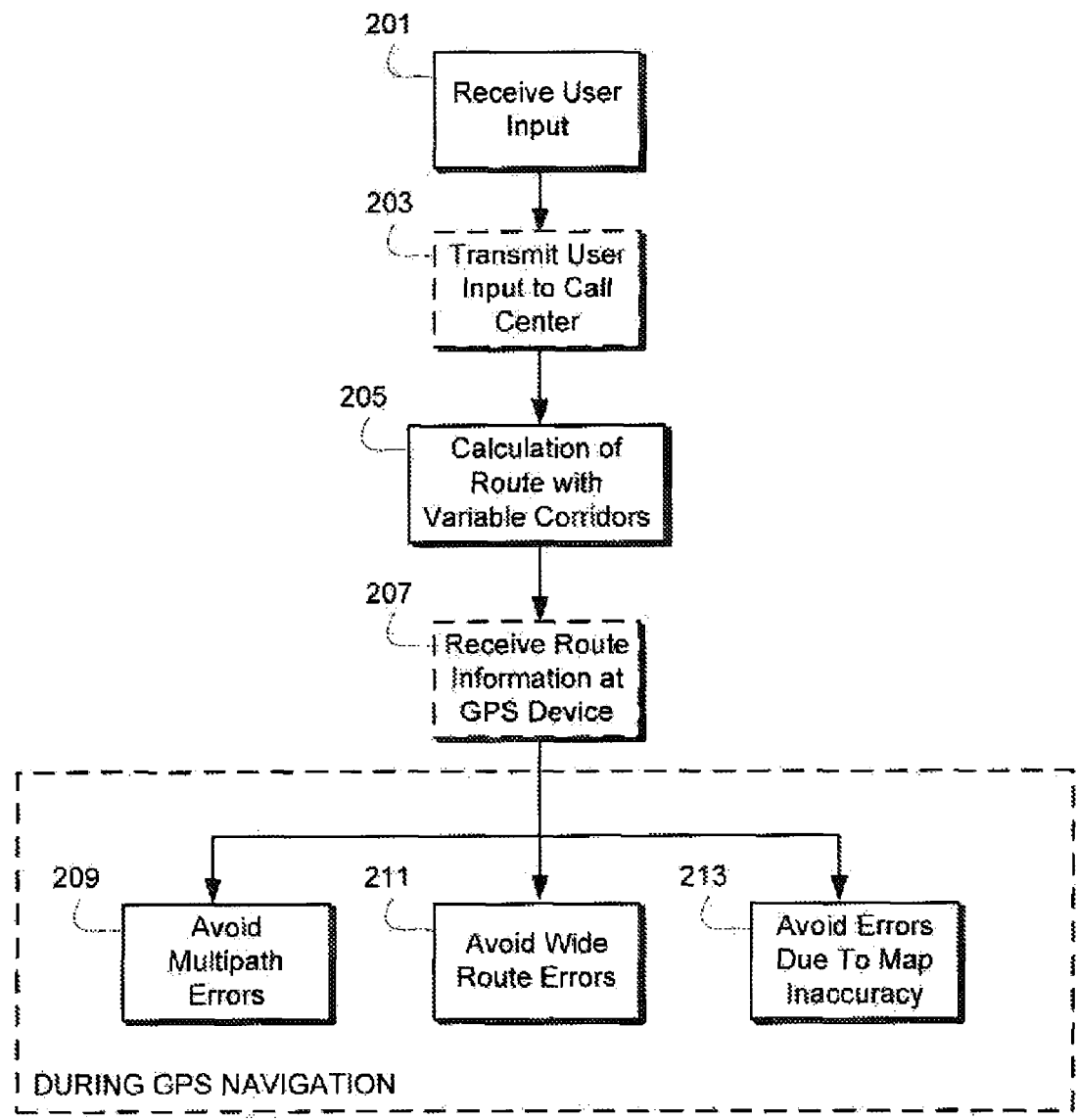
FIG. 2 is a flowchart illustrating a process for utilizing variable corridors in GPS navigation in accordance with an implementation of the described principles.

With further reference to the architecture of FIG. 1, and turning more specifically to FIG. 2, a process 200 for utilizing variable corridors in GPS navigation is depicted. The process 200 depicted in FIG. 2 may be performed in the context of a telematics system where the route calculating intelligence may be located at the telematics unit or at a TSP call center. The telematics unit first receives a route request from a user 201, which may include the user inputting a destination into the telematics unit. If the route calculation intelligence is located at the TSP call center, this user input may further be transmitted by the telematics unit to the TSP call center 203.

After receiving the user input corresponding to an intended destination, the telematics unit or the TSP call center may perform route calculation utilizing variable route corridors 205. Conventional route corridors are of a uniform size, corresponding to a set region around a calculated route wherein the GPS unit of the telematics unit will determine that the vehicle is on route. By implementing variable route corridors corresponding to urban canyon environments, wide route areas, or other map features, a more robust and useful system and method for GPS navigation may be achieved as described in further detail below.

If the calculated route is provided by the TSP call center, the telematics unit may receive the route information after the route has been calculated 207. Regardless of whether the route is calculated at the telematics unit or at the TSP call center, the telematics unit uses the calculated route with variable corridors during GPS navigation in order to avoid multipath errors 209 caused by urban canyon environments, avoid wide route errors 211 caused by areas where the road traveled by the vehicle may be particularly wide, and also to avoid errors due to inaccuracies in map data 213.

Figure 3:
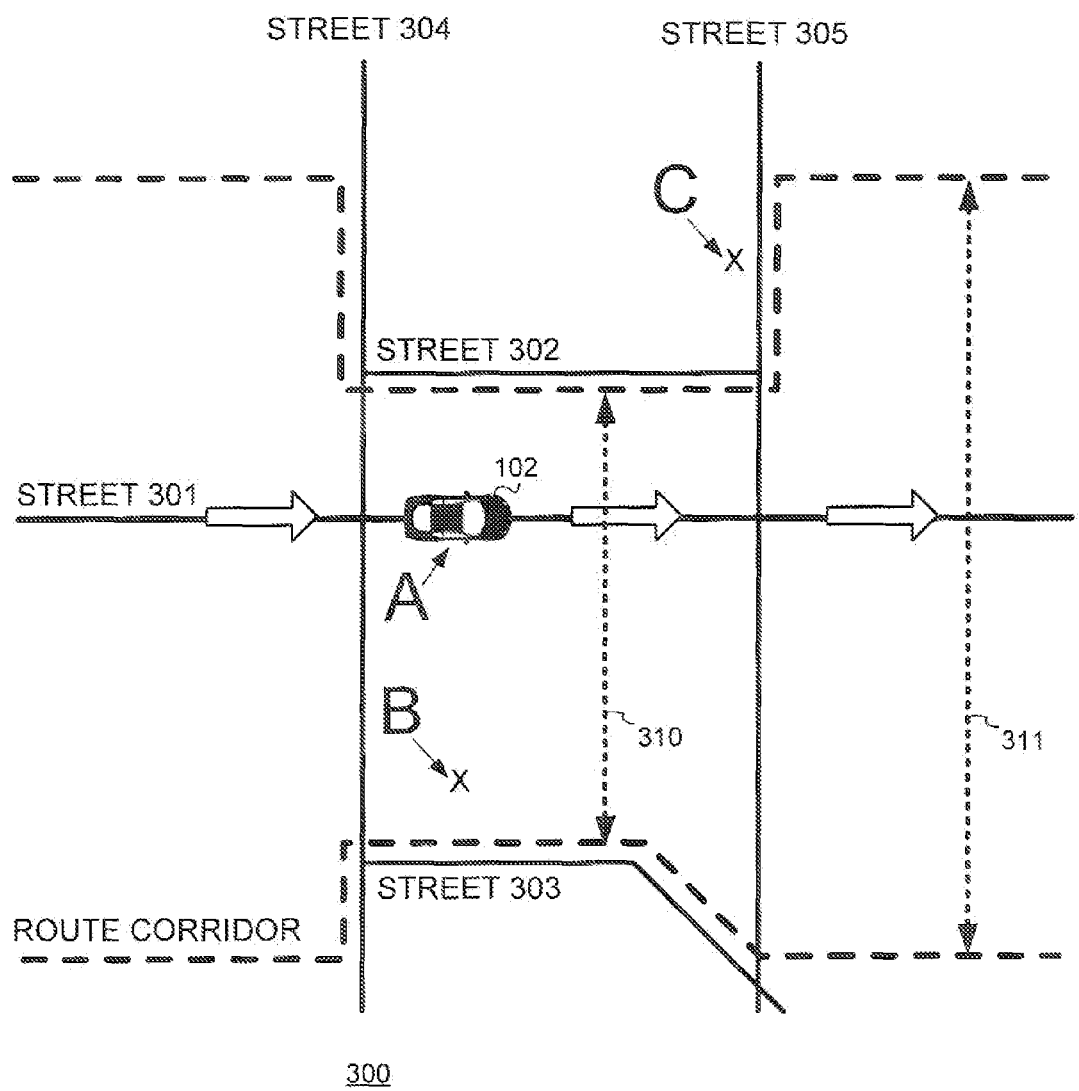
FIG. 3 is a diagram illustrating an example of variable corridors in an urban canyon environment in accordance with an implementation of the described principles.

FIG. 3 provides an example 300 of an implementation of these variable route corridors according to the present invention in an urban canyon environment. As mentioned above, multipath errors may occur in urban canyon environments where GPS signals are prone to bounce off of the various buildings. In this example, the calculated route of vehicle 102 indicates that the vehicle 102 should travel along street 301 (as shown by the arrows). To minimize multipath errors while the vehicle 102 is traveling along street 301, the calculated route includes a variable route corridor (shown by the dashed lines), that is narrow at some points, for example, as indicated by dotted line 310, and wider at other points, for example, as indicated by dotted line 311.

In this example, if the telematics unit receives route information that the vehicle is actually at point A and on the street 301, but due to multipath errors, the telematics unit determines that the vehicle is at point B (marked by an X), which may not be on any street, the GPS unit will still determine that the vehicle 102 is on route because point B is within the route corridor. However, if the vehicle 102 takes a wrong turn and ends up on streets 302, 303, 304 or 305 in a region outside of the route corridor, for example at point C (marked by another X), and the telematics unit detects the vehicle's position as such, the telematics unit may provide an off-route notification and route recalculation as appropriate in that situation. Therefore, it will be appreciated that the variable route corridors may be tailored to map features to provide the vehicle 102 with a wide corridor width in urban canyon environments where possible (e.g. 311) to minimize the effect of multipath errors, and simultaneous provide a narrower route corridor width (e.g. 310) when necessary such that the telematics unit is able to respond appropriately when the vehicle actually does go off-route.

It will be appreciated that the route corridors on either side of the vehicle may be the same (i.e. symmetric) or may be managed independently. FIG. 3 depicts an example where the route corridors on either side of the vehicle are configured independently to match the map features. Thus, as can be seen in FIG. 3, because the nearest street above the vehicle's present position is closer than the nearest street below the vehicle's present position, the distance of the vehicle to the edge of the corridor may be greater below the vehicle than it is above the vehicle. In a further implementation, a route corridor may be added behind the vehicle to prevent the GPS unit from erroneously determining that the vehicle's position is at a point that the vehicle has already traversed.

Figure 4:
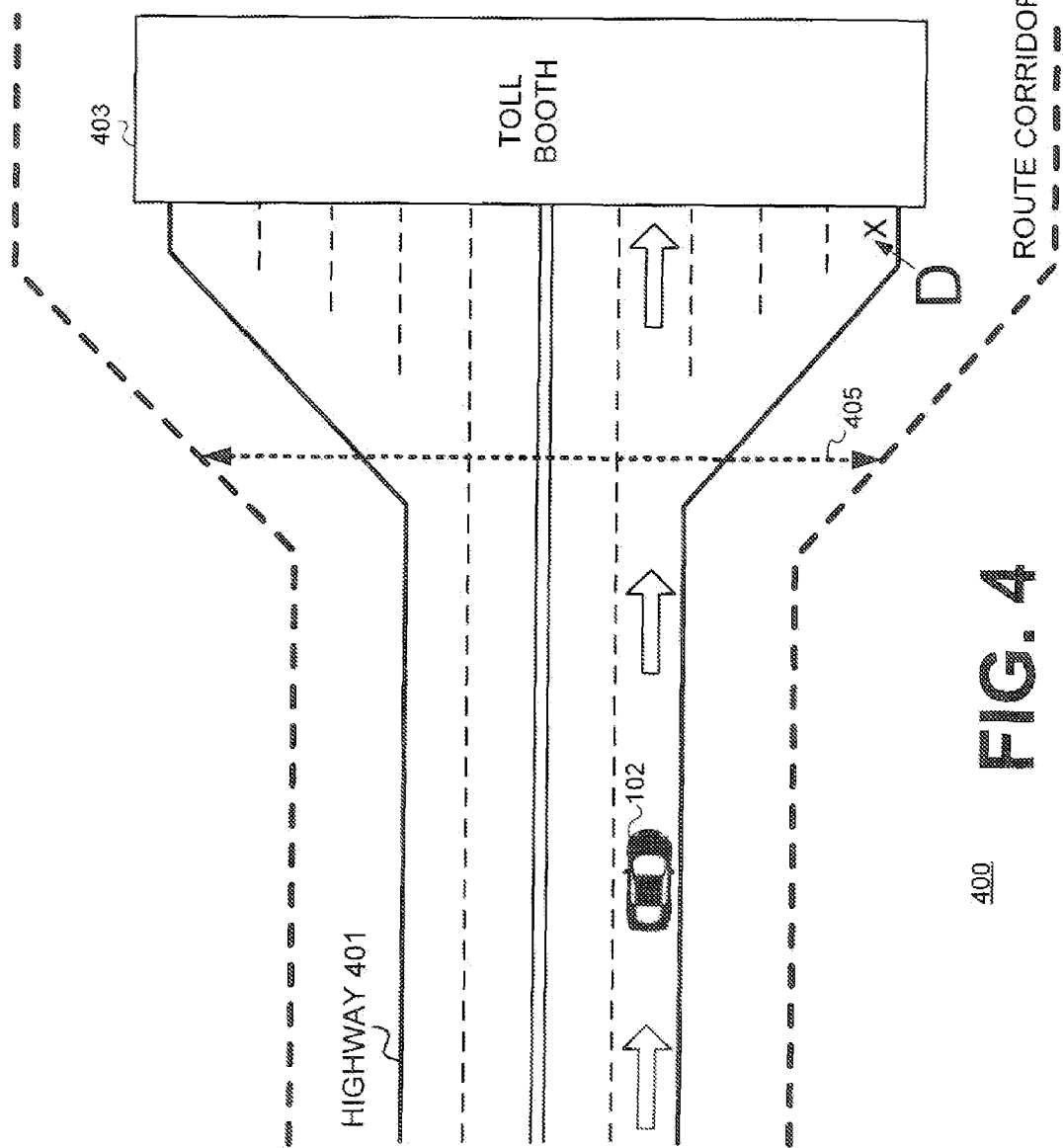
FIG. 4 is a diagram illustrating an example of variable corridors in connection with a highway and toll booth in accordance with an implementation of the described principles.

FIG. 4 provides another example 400 of an implementation of variable route corridors according to the present invention in a situation where a calculated route may be subject to wide route errors. In this example, vehicle 102 is traveling along highway 401 which includes a toll booth 403. Because highways often expand by many lanes in toll booth areas, a vehicle utilizing a conventional GPS unit may travel outside of a route corridor when they pass through a toll area, resulting in off-route notifications to be inappropriately displayed or route recalculation to be inappropriately be performed. In FIG. 4, the corridor width of the route corridor (marked by the bolded dashed lines along the outside) varies with the width of highway 401, as shown by dotted line 405. Thus, even if the vehicle 102 takes the outermost lane when passing through toll booth 403, for example at point D (marked by the X in FIG. 4), the telematics unit of vehicle 102 will still determine the vehicle to be on route.

In a further implementation, the width of the variable route corridors may further be based on the type of road the vehicle is traveling on. For example, if the road is traveling on a limited access highway (i.e. a highway where on and off ramps are only available at certain intersections), the width of the variable route corridor may be increased in areas where there is no off-ramp for the vehicle to leave the highway.

In yet another further implementation, the width of the variable route corridors may further be based on the number of lanes of a road as defined in the map data utilized by a GPS unit. In yet another further implementation, the width of the variable route corridors may further be based on the speed at which the vehicle is traveling. GPS positioning errors tend to be more likely at slow or stopped speeds, and thus, the variable route corridors may be configured to be larger when the vehicle is traveling at slow speeds and smaller when the vehicle is traveling at higher speeds.

In yet another further implementation, wide route corridors may be implemented wherever possible to minimize errors due to map data inaccuracies or position information inaccuracies. For example, a vehicle may be traveling along a road in reality, but because of an error in map data (e.g. the road has inaccurate GPS coordinates associated with it) or because of errors in position information (e.g. multipath errors), the vehicle may determined to be off-route by a conventional GPS unit when the vehicle is actually on-route. By utilizing wider route corridors with the present invention, such instances of erroneous off-route determination may be minimized. However, it will be appreciated that the use of wide route corridors should be balanced with the need to determine when the vehicle has actually gone off-route. Thus, the width of the variable route corridors should be adjusted to account for map features, particularly, the location of other streets not on the route as discussed above with respect to FIG. 3.

In a further implementation, the width of the variable route corridors may further be based on known, estimated or unknown inaccuracies in map data (e.g., a geographic region that is known or estimated to be not precisely mapped may be assigned relatively larger route corridors during route calculation). For example, in rural regions in particular, map data may be more likely to be inaccurate. The degree of inaccuracy may be known, estimated, or unknown. Because the road networks in these rural regions tend to be relatively sparse, the width of the corridors may be increased significantly to account for these known, estimated or unknown map inaccuracies and improve navigation performance.

It will be appreciated by those of skill in the art that the execution of the various machine-implemented processes and steps described herein may occur via the computerized execution of computer-executable instructions stored on a tangible, non-transient computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center. It will further be appreciated that, although the above implementations have been described in the context of a telematics unit and vehicles, the principles described herein are not limited to telematics units or vehicles and may also be implemented on standalone GPS devices and other types of GPS navigation units (such as those provided on mobile phones).

It will thus be appreciated that the described system and method allows for GPS navigation utilizing a previously stored position as a starting port when current position information is not available. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for (Global Positioning System (GPS) navigation utilizing variable route corridors, comprising:
   receiving, at a GPS device, input from a user corresponding to an intended destination;
   calculating a route from a starting position to the intended destination, wherein calculating the route includes determining a variable route corridor, a segment of the variable route corridor having a first corridor boundary and a second corridor boundary, the first corridor boundary and the second corridor boundary having different perpendicular distances to the route, and wherein determining the variable route corridor comprises:
      determining the first corridor boundary for the segment based on location of a first street that does not intersect the route; and
      determining the second corridor boundary for the segment based on location of a second street that does not intersect the route;
   receiving position information corresponding to a determined position of the GPS device; and determining whether the determined position of the GPS device is within the variable route corridor.

2. The method of claim 1, wherein determining the first corridor boundary and determining the second corridor boundary are further based on at least one of known, estimated, and unknown inaccuracies of the map data.

3. The method according to claim 1, wherein the GPS device is a telematics unit on a telematics-equipped vehicle.

4. A method for (Global Positioning System (GPS) navigation utilizing variable route corridors, comprising:
   receiving, at a call center, information from a telematics unit corresponding to an intended destination;
   calculating a route from a starting position to the intended destination, wherein calculating the route includes determining a variable route corridor, a segment of the variable route corridor having a first corridor boundary and a second corridor boundary, the first corridor boundary and the second corridor boundary having different perpendicular distances to the route, and wherein determining the variable route corridor comprises:
      determining the first corridor boundary for the segment based on location of a first street that does not intersect the route; and
      determining the second corridor boundary for the segment based on location of a second street that does not intersect the route;
   transmitting, to the telematics unit, the calculated route.

5. The method of claim 4, wherein determining the first corridor boundary and determining the second corridor boundary are further based on at least one of known, estimated, and unknown inaccuracies of the map data.

6. The system of claim 5, wherein determining the first corridor boundary and determining the second corridor boundary are further based on at least one of known, estimated, and unknown inaccuracies of the map data.

7. A system for (Global Positioning System (GPS) navigation, comprising a tangible, non-transient computer-readable medium having thereon computer executable instructions, the computer executable instructions comprising instructions for:
   receiving input from a user corresponding to an intended destination;
   calculating a route from a starting position to the intended destination, wherein calculating the route includes determining a variable route corridor, a segment of the variable route corridor having a first corridor boundary and a second corridor boundary, the first corridor boundary and the second corridor boundary having different perpendicular distances to the route, and wherein determining the variable route corridor comprises:
      determining the first corridor boundary for the segment based on location of a first street that does not intersect the route; and
      determining the second corridor boundary for the segment based on location of a second street that does not intersect the route.

8. The system of claim 7, wherein the tangible, non-transient computer-readable medium is part of a telematics unit in a vehicle.

9. The system of claim 8, the computer-executable instructions further comprising instructions for:
   receiving position information corresponding to a determined position of the GPS device; and
   determining whether the determined position of the GPS device is within the variable route corridor.

10. The system of claim 7, wherein the tangible, non-transient computer-readable medium is located at a call center.

* * * * *